Nov. 12, 1946.　　W. L. SLIMP　　2,411,009
TRAILER COUPLER
Filed March 19, 1945　　2 Sheets-Sheet 1
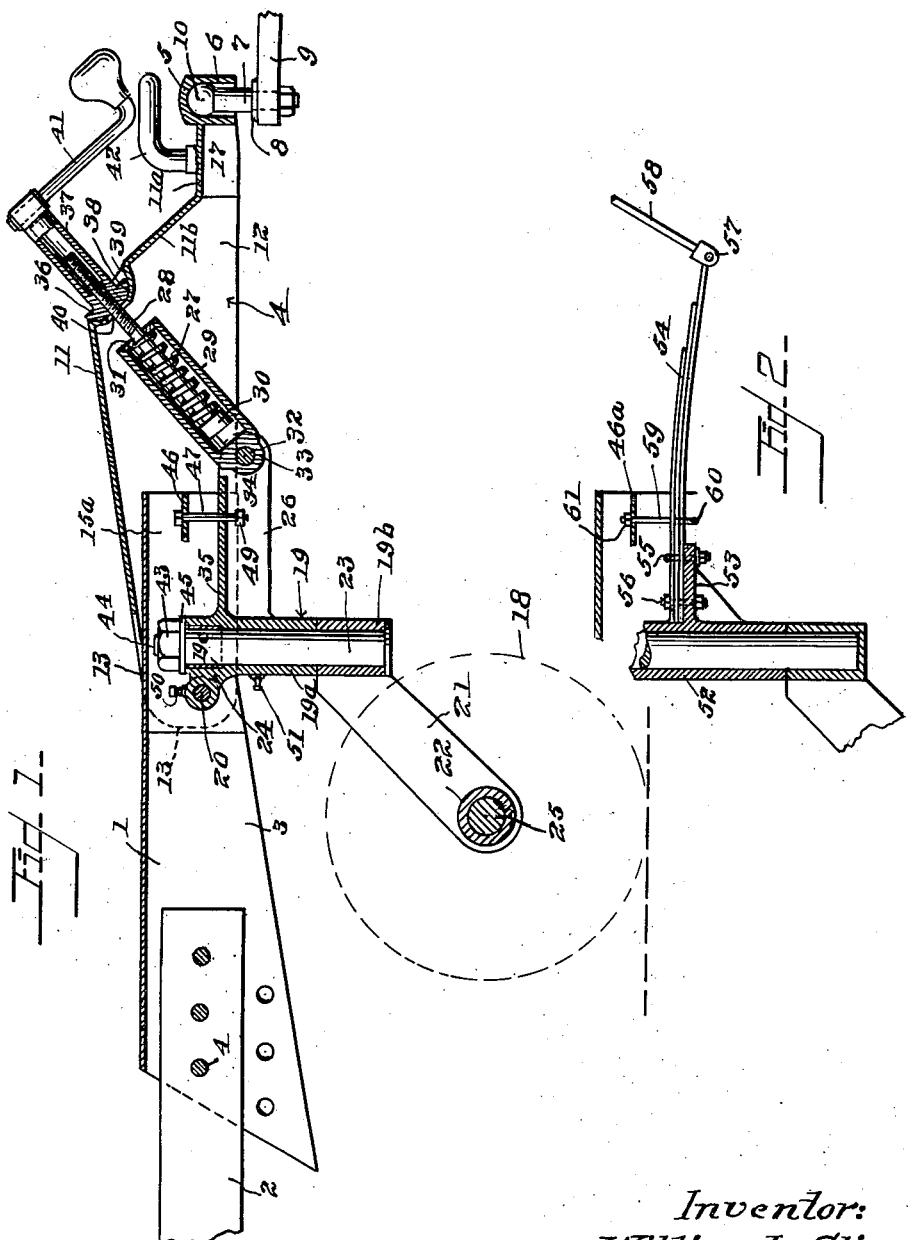
Inventor:
William L., Slimp
By
Francis D. Ammen
his Atty.

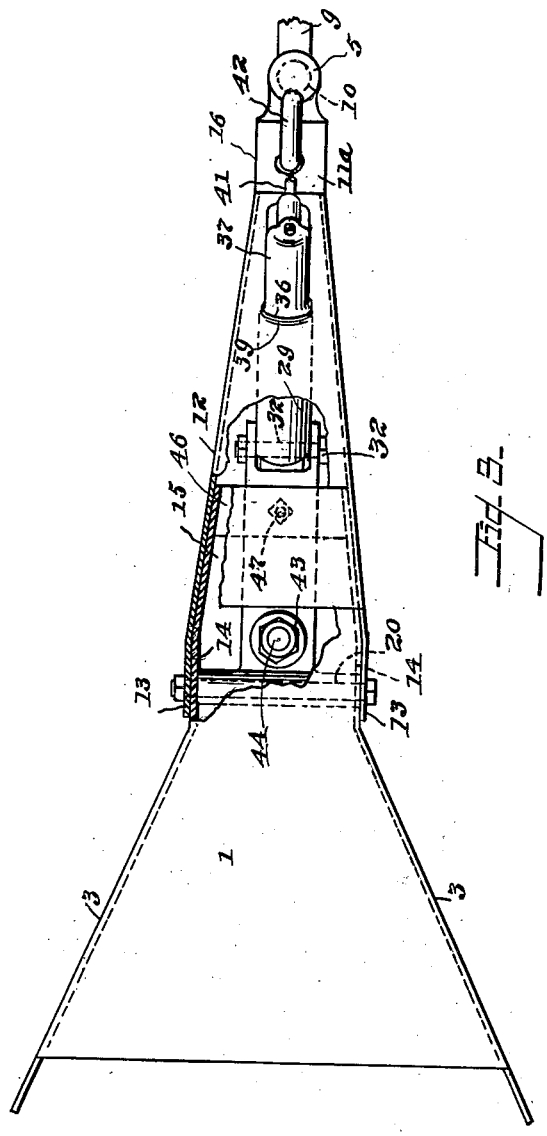

Patented Nov. 12, 1946

2,411,009

UNITED STATES PATENT OFFICE 2,411,009

TRAILER COUPLER

William L. Slimp, Los Angeles, Calif.

Application March 19, 1945, Serial No. 583,576

9 Claims. (Cl. 280—33.44)

This invention relates to a trailer coupling, that is to say, a coupling particularly adapted for use to couple a trailer to a towing car such as an automobile.

One of the difficulties encountered in the operation of trailer couplings is that a considerable part of the weight of the trailer is borne by the coupling that attaches the trailer to the draw-bar or towing coupling member of the automobile. This, of course, refers to trailers of the two wheeled type in which it is necessary to have a portion of the weight at least, borne by the connection to the automobile, in order to maintain the coupled members together; it being understood, that usually the coupling of the two coupling members together is effected by a relative movement of the two coupling members in a general vertical direction. This difficulty is not so great where the car and trailer are running on a smooth, level roadway, but when bad road conditions are encountered on the road surface, there is a tendency for the forward end of the trailer to swing down at its forward end, which increases the downward pressure, or load on the draw-bar of the towing car. This tendency occurs also, and is aggravated by the sudden application of the brakes of the automobile that is towing the trailer, particularly if the trailer is heavily loaded.

The fact that the center of gravity of the load is at a considerable elevation above the road surface tends to occasion a rotation of the trailer body with its load about the axle of the wheels. For this reason, the load bearing down on the coupling varies considerably, but of course, there must always be enough load borne at the coupling to insure that the trailer coupling member will not swing up and disconnect itself from the towing coupling member.

One of the objects of this invention is to provide a coupler of this type that will overcome these difficulties, and which will provide means operating to reduce considerably, and control the amount of weight that is borne by the towing coupler member.

Another object of the invention is to provide a coupler of this type with features of construction that will give resiliency to the coupler connection, attaining a spring suspension effect, so that the trailer coupling member, although it imparts a down thrust to the towing coupler member, this thrust will be a yielding thrust.

Another object of the invention is to provide a trailer coupler of simple construction including a ground-wheel or wheels that will support a considerable amount of the load at the trailer tongue, and which will absorb a considerable amount of the increased pressure from the load and from the momentum of the trailer when the towing car's brakes are being applied; and which, at the same time, will provide means for resiliently resisting this increased down pressure, and imparting a sufficient proportion of the same to the coupling members to maintain them constantly in engagement with each other.

Another object of this invention is to provide a construction for the coupler including a spring, in which the spring is so mounted that it offers relatively slight resistance to reactions of the supporting wheel for the coupler for slight changes in the roadway level, but in which the leverage arm, or "purchase," of the thrust of the spring increases with the increase of change of level of the road surface, my general purpose being to enable a relatively light spring to be used in the construction and at the same time to enable the increasing leverage of the spring to develop a snubbing effect.

Another object of the invention is to provide a construction having the features referred to above, and including means for enabling the amount of yielding pressure developed at the engaging members of the coupling, to be adjusted as desired.

While the invention is described in the following specification primarily as a coupler adapted to be connected to the forward end of a trailer already in use, nevertheless, it will be obvious from the following specification that the combination of parts embodied in this invention could be originally incorporated into the forward end of a trailer, that is to say, applied and secured permanently to the towing tongue of a trailer before it leaves the factory.

Further objects of the invention will appear hereinafter.

The invention consists in the novel parts and combination of parts to be described hereinafter, all of which contribute to produce an efficient trailer coupling.

A preferred embodiment of the invention is described in the following specification, while the broad scope of the invention is pointed out in the appended claims.

In the drawings:

Figure 1 is a vertical section taken in a front-and-rear central plane through a trailer coupler embodying my invention, and showing the same connected at its rear-end to a trailer tongue that is shown broken away; its forward end being shown as attached to the drawbar of the towing automobile.

Figure 2 is a fragmentary section similar to Figure 1, but illustrating a modified embodiment of the invention in which a leaf spring is employed instead of a coil spring as shown in Figure 1.

Figure 3 is a plan of the coupler with certain parts broken away to disclose details of parts located below.

Referring particularly to Figures 1 and 3 which illustrate the invention constructed as an attachment to be attached to the tongue member of a trailer, I provide a tongue extension or adaptor 1 which would have a shape and construction to enable it to fit onto the tongue of the trailer with which the coupler was intended to cooperate. In the present instance it is assumed that the tongue on the trailer tapers in a forward direction as is common in many trailers, terminating in a tip or extension 2 that fits into the rear end of the adaptor 1. In this case the adaptor is formed out of a large plate which is nearly triangular in plan, and provided with downwardly extending integral side flanges 3, the inner faces of which operate as cheeks against which the sides of the tongue extension 2 fit.

As the height of the tongue extension 2 varies considerably in different trailers, I provide rows of holes 4 at different levels, and these holes register with corresponding holes in the tongue extension of the trailer so as to enable bolts to be applied for securing the adaptor in place.

The forward end of the adaptor or tongue extension 1 has a joint connection to the trailer coupler 4, the forward end of which is formed into a coupler head or coupling member which is preferably in the form of a sockethead 5, that is to say, it has a deep bore or socket 6, the mouth of which is disposed downward so that it can drop down over the towing coupler member 7.

This towing coupler member 7 in the present instance is in the form of a pin shouldered onto a boss 8 on the upper side of the draw-bar 9 that extends back from the towing car or automobile, and this pin terminates above in a knob 10 which is substantially spherical so as to socket itself and fit closely into the concave inner face of the socket-head 5.

The body portion of the trailer or coupler 4 is also preferably constructed of plate material, and includes a cover portion or top plate 11 with integral side flanges 12 that terminate forwardly in two ears 13 that fit against cheeks 14 formed on the side flanges 3 of the tongue extension 1; and these cheeks are not inclined but extend in a front-and-rear direction. Beyond these cheek-plates or cheeks 14 the tongue extension 1 terminates in a tapered nose 15 that fits against the inner faces of the side flanges 12 of the trailer coupler member 4 (see Figure 3).

The side flanges 12 converge substantially throughout their entire length, but at the extreme forward end they present straight extensions 16 which, like the cheek-plates 14, extend in a true front-and-rear direction; and at this point the top plate or cover plate 11 has a flat substantially horizontal extension 11a, so that a substantially rectangular or box like nose 17 is formed at this point which may be formed either integrally with, or separate and attached to, the coupling head 5, already described. Between the extension 11a of the cover plate 11 and the rear portions of this plate, a steeply inclined extension 11b is provided which will be referred to and described with more particularity in connection with the resilient means I employ for imparting some of the load resiliently to the socket-head 5 to hold it down on the coupling knob 10.

The tongue member or adaptor 1 and the trailer coupler 4 are supported on a ground-wheel or ground-wheels 18 through the agency of a bracket 19, which bracket includes a sleeve-form body portion 19a that is attached to the tongue member 1 and the trailer coupler 4, preferably at, or adjacent to, the joint between those two parts. In the present instance the bracket body 19a is illustrated as attached directly to a pivot pin or bolt 20 that pivotally attaches the tongue member 1 and the trailer coupler 4 together for articulation, or swinging movement about a horizontal axis. And the bracket member includes a wheel arm or a pair of such arms 21 which extend downwardly and rearwardly between the two wheels so as to support a bearing 22 for the axle 25 connecting them. By mounting the ground-wheel in a rearward position in this way, it operates as a caster wheel, because the upper ends of the wheel-arms are attached to a swivel pin or pintle 23 that extends up into the bore of the sleeve 19a of the bracket 19. In other words, the lower end carries the pintle 23 fixed by welding or otherwise to the sleeve 19b that constitutes the lower end of the bracket 19. A bearing bushing 19c may be countersunk into the upper end of the sleeve 19a.

The upper end of the bracket body 19a is provided with a rearwardly projecting lug 24 that carries the long pivot bolt 20 already referred to, but this bolt is located a considerable distance forward of the location of the bearing 22 for the axle 25 of the ground-wheels 18. The effect of this is that the pressure of the road surface against the tread of the ground-wheel or wheels exerts a turning moment on the bracket, urging it to rotate on the long bolt 20 in a clockwise direction. This force or turning moment is resisted by resilient means that connects the bracket 19 to the trailer coupler 4, that is to say, resilient means is provided cooperating with these parts so as to develop a downward thrust on the trailer coupler 4 to hold its socket-head 5 resiliently pressed against the knob 10. In order to accomplish this effect I prefer to provide the bracket body 19a with a forwardly disposed extension or spring-arm 26, and this arm is associated with the resilient means that I employ.

The resilient means employed may be a spring of any kind, for example, it may be in the form of a leaf-spring as shown in Figure 2; but in Figure 1 I have illustrated this spring as consisting of a coil spring 27, carried on a long spindle or stem 28, and housed within a spring-barrel 29, the arrangement being such that the lower end of the spring thrusts against a head 30 formed on the lower end of the stem 28, while the upper end of the spring thrusts against the upper head 31 of the spring-barrel. This head 31 may, if desired, be threaded into the upper end of the barrel if it is desired to have the spring 27 accessible; but if not, the head 31 may be welded into the upper end of the barrel.

The lower end of the spring-barrel 29 is connected to a knuckle joint, including a knuckle-pin 32 passing through a lug 33 formed on the lower head of the barrel 29, said lug and head being disposed between side flanges 34 that extend down from the web 35 and help to form the body of the arm 26.

The distortion, and force stored in the spring 27 can be regulated, for which purpose I provide means seating on the extension 11b of the cover plate 11. In the present instance, in order to provide an adjustment, I provide screw threads on the upper end of the stem 28, and these threads engage similar threads formed at the lower end of an adjusting sleeve 37. The mounting for the sleeve 37 at this point is such as to accommodate the lateral swinging movement of the knuckle pin 32 about the pivot-bolt 20 as an axis. In the present instance I form the underside of the lower end of the sleeve 37 into a head 36 having a convex bottom face 38 which seats in a concave socket 39 that I form or press into the plate extension 11b; and at the bottom of this concave face or socket, a clearance opening 40 is provided through which the threaded stem 28 extends. This opening is large enough, of course, to prevent the side of the stem from hitting it when the coupler is in use, allowance being made for rough roadways.

The upper end of the adjusting sleeve 37 is provided with a crank 41 for rotating it. By rotating this crank in one direction the head 30 can be pulled up so as to increase the degree of compression of the spring 27. However, the spring 27 should be short enough so that if the crank 41 is rotated in a reverse direction the head 30 can move down far enough to relieve the spring of all compression. When this occurs then there is no spring force holding the socket-head 5 down on the coupling knob 10, and hence, at this time the socket head 5 can be easily pulled up to disengage it from the knob 10, by seizing and pulling up on a handle 42 that is secured on the upper side of the plate extension 11a.

In assembling the ground-wheel into the structure, the pintle 23 is run up into the sleeve 19a from below, and is secured in position by a nut 43 that is threaded onto a tip 44 of reduced diameter, formed on the upper end of the pin or pintle 23. This nut seats against a washer or plate 45 that seats against a shoulder (not illustrated) on the upper end of the pintle body. This shoulder prevents the nut from clamping the sleeve 19a of the bracket between the sleeve 19b and the washer 45, and of course, this insures free swiveling movement on the axis of the pintle 23 at all times.

When the ground-wheel 18 is running along the roadway, if a "hump" or elevated spot on the roadway is suddenly encountered, the wheels 18 will be suddenly forced upwardly, which will cause a rotation of the bracket 19 on the pivot bolt 20, and this will pull down the knuckle-pin 32 in an arc struck from the axis of the bolt 20. This movement is intended and is all right but must be snubbed to prevent its ever going too far; for which purpose I provide suitable stop-means. In the present instance this is illustrated as including a horizontal web plate 46 that bridges the space between the side flanges 15a of the nose 15; and this web carries a bolt 47 that hangs down from it with the lower portion of the bolt passing through a free opening 48 in the body web 35 of the arm 26, and also carries an adjustable nut 49 at a sufficient distance below the web 35. If desired a small coil spring, or several spring washers, can be placed on the lower end of this bolt 47, so as to prevent it from snubbing the movement too abruptly.

It will be evident that in practical use the caster wheel effect of the mounting for the ground-wheel or wheels 18 is very advantageous because it assists, and cooperates with, any turning movements of the towing vehicle on the roadway, as the ground-wheels 18 will swing on the swivel pin 23 to "track" in the right direction and will not, therefore, offer any resistance whatever to the trailer or the towing car when turning corners, or when running along a curved roadway.

Any or all of the bearings in the construction may be provided with Alemite fittings such as the Alemite fittings 50 and 51 provided respectively for the pivot bolt 20 and the pintle 23.

In Figure 2 I illustrate a construction for interposing resilient means between the bracket and the trailer coupler 4, which avoids the necessity for using a coil spring. As illustrated in Figure 2, I provide the wheel bracket 52 with an arm 53 with side flanges, and on the upper face of which a leaf-spring 54 is mounted, filling the space between the side flanges, and secured by a suitable U-bolt 55 and through-bolt 56 in the socket formed between the flanges. The end of this spring 54 has a shackle 57 that is attached to a long stem 58 that corresponds to the stem 28, and the upper end of which is threaded into an adjusting sleeve (not illustrated) like the sleeve 37 already described. The action of this arm and spring 54 is substantially the same as that of the spring 27 and the arm 26. In this case, however, the snubbing is effected by a U-bolt or stirrup 59 the crossbar 60 of which extends across somewhat below the bottom leaf of the spring. The forks of this stirrup pass up through a bridge-bar 46a similar to the bridge-bar 46, and are secured by a nut 60 on the threaded end of each fork. A leaf spring such as this has some advantages as compared with a coil spring.

An inspection of Figure 1 indicates that as the caster wheel 18 is moved upwardly by a sudden relative elevation of the road surface, the extension 26 will swing downwardly around the axis of the pivot pin 20, and as this movement takes place the leverage arm or purchase of the spring, acting on the extension 26, will increase. The amount of this increase will, of course, depend upon the amount of movement that is possible for the extension 26 before its swinging movement is stopped by the permanent, or fixed, stop 49. This enables me to employ a somewhat lighter spring 27 than would otherwise be necessary, and enables the spring to readily absorb slight movements of the wheel arm 21 in an upward direction, which gives easy riding to the coupler. It also stiffens up the resistance of the spring where the amount of movement is relatively great and gives a desirable resilient snubbing action.

The arms 26 and 53 are located at a high enough level to clear the wheels 18 whenever they swing under them.

Many other embodiments of this invention may be resorted to without departing from the spirit of the invention.

I claim as my invention:

1. In a trailer coupler for connecting a trailer to a towing vehicle, the combination of a trailer coupling member and a towing coupling member attached respectively to the trailer and to the towing vehicle, said members having a coordinated construction enabling the same to be coupled together by a relative movement in a general vertical direction, a ground-wheel, a bracket including a body pivotally connected to the trailer coupling member to swing in a substantially vertical plane, and having a forwardly projecting extension, said bracket including a wheel arm located below said forwardly projecting extension, and having a bearing for the ground-wheel, means connecting said bracket to the said body to swing on a substantially vertical axis, said wheel arm extending rearwardly from said axis, and resilient means connected with said forward extension of said bracket and exerting pressure upon said forward extension that resists the pressure of the road surface against the ground-wheel, and in a direction inclined to said extension so that as the downward movement of the forward extension increases, the leverage arm of the resilient means increases.

2. In a trailer coupler for connecting a trailer to a towing vehicle, the combination of a trailer coupling member and a towing coupling member attached respectively to the trailer and to the towing vehicle, said members having a coordinated construction enabling the same to be coupled together by a relative movement in a general vertical direction, a ground-wheel, a bracket including a body pivotally connected to the coupling members to swing in a substantially vertical plane, and having a forwardly projecting extension, said bracket including a wheel arm having a bearing for the ground-wheel, and connected with the said body to swing on a substantially vertical axis, said arm extending rearwardly from said axis, resilient means supported on the trailer coupling member and connected with said forward extension of said bracket, an adjusting stem associated with said resilient means, means associated with said stem and said trailer coupling for adjusting said stem to vary the tension of said spring and adapt the same to the pressure of the road surface against the ground-wheel.

3. In a trailer coupler for connecting a trailer to a towing vehicle, the combination of a trailer coupling member and a towing coupling member attached respectively to the trailer and to the towing vehicle, said members having a coordinated construction enabling the same to be coupled together by a relative movement, a ground-wheel, a bracket, including a body having a pivot connection with the trailer coupling member to swing in a substantially vertical plane, and having a forwardly projecting extension, said bracket including a wheel arm having a bearing for the ground-wheel, and connected with the said body to swing on a substantially vertical axis, said arm extending rearwardly from said axis, resilient means supported on said trailer coupling member, connected with said forward extension of said bracket, and including a threaded stem extending upwardly from said spring, and a threaded member supported on said trailer coupling member for engaging said threaded stem, and having means for rotating the same to adjust the tension of said resilient means in resisting the pressure of the road surface against the ground-wheel.

4. A trailer coupling according to claim 3 including a stop for positively snubbing the movement of the bracket when said resilient means yields under the action of the pressure of the road surface against the ground-wheel.

5. In a trailer coupler for connecting a trailer to a towing vehicle, the combination of a trailer coupling member and a towing coupling member attached respectively to the trailer and to the towing vehicle, said members having a coordinated construction enabling the same to be coupled together by a relative movement, a ground-wheel, a tongue member extending forwardly from the trailer, pivotally connected to the trailer coupling member to permit relative rotation of the same on a substantially horizontal axis, a bracket including a body pivotally connected to the aforesaid parts for rotation on a substantially horizontal axis, said bracket including a body on which the said pivotal connection is effected, and including a forwardly projecting extension, and a wheel arm extending rearwardly and having a bearing for the ground-wheel, said wheel-arm being mounted to swivel on the body of the bracket on a substantially vertical axis, resilient means for exerting an upward thrust on said forward extension, and means for adjusting the same to adapt it to resist the pressure of the road surface against the ground-wheel.

6. A trailer coupling according to claim 5 in which the body of the bracket is pivotally connected to the said tongue member and the trailer coupling member on the same axis of rotation on which the tongue member and the trailer coupling member are connected to each other.

7. In a trailer coupler for connecting a trailer to a towing vehicle, the combination of a trailer coupling member and a towing coupling member attached respectively to the trailer and to the towing vehicle, said members having a coordinated construction enabling the same to be coupled together by a relative movement in a general vertical direction, a ground-wheel, a tongue member extending forwardly from the trailer, pivotally connected to the trailer coupling member to permit relative rotation of the same on a substantially horizontal axis, a bracket including a body pivotally connected to the aforesaid parts for rotation on a substantially horizontal axis, said bracket including a body on which the said pivotal connection is effected, and including a forwardly projecting extension, and a wheel arm extending rearwardly and having a bearing for the ground-wheel, said wheel-arm being mounted to swivel on the body of the bracket on a substantially vertical axis, a leaf spring attached to the wheel bracket, and means connecting the same to the trailer coupling for exerting a downward thrust on the same.

8. In a trailer coupler for connecting a trailer to a towing vehicle, the combination of a trailer coupling member and a towing coupling member attached respectively to the trailer and to the towing vehicle, said members having a coordinated construction enabling the same to be coupled together by a relative movement in a general vertical direction, a ground wheel bracket, a pivot supporting the same for rotation on the trailer member about a substantially horizontal axis, a caster-wheel carried by the bracket, located to the rear of the said pivot support, said bracket having a forwardly disposed extension, resilient means disposed between said forward extension and a forward portion of said trailer coupling member for resisting a downward movement of said extension when the caster wheel is raised by a relative elevation of the road surface.

9. A trailer coupler according to claim 8 including a tongue extending forwardly from the trailer, the rear portion of the trailer coupling member having a pivotal connection to said tongue, and in which the first named pivot connection on the said horizontal axis connects the wheel bracket to said tongue.

WILLIAM L. SLIMP.